Patented July 12, 1927.

1,635,594

UNITED STATES PATENT OFFICE.

HERMANN WAGNER, OF SODEN-ON-THE-TAUNUS, GERMANY, ASSIGNOR TO GRASSELLI DYESTUFF CORPORATION, OF NEW YORK, N. Y., A CORPORATION OF DELAWARE.

AZO DYE AND PROCESS OF PRODUCING SAME.

No Drawing. Application filed December 22, 1925, Serial No. 77,098, and in Germany June 11, 1923.

I have found that dyestuffs giving dyeings of excellent fastness are obtained by diazotizing or tetrazotizing aminoazo- or diamino azo dyestuffs, which contain at least one free hydroxyl group, but no sulfo group, and coupling them with one or two molecules of an arylamide or 2-hydroxynaphthalene-3-carboxylic acid including substitution products thereof. By the term "a hydroxyl group" I understand in the following description and in the claims not only phenolic hydroxyl groups, i. e., hydroxyl groups attached to an aryl residue, but also those constituting a part of the carboxylic acid group. The constitution of the intermediates of the dyestuffs in question will be illustrated by the following general formulæ:—

$$NH_2R-N=N-R'(OH)$$
$$NH_2R-N=N-R'(NH_2)(COOH)$$
$$NH_2R-N=N-R'(OH)(COOH)$$
$$NH_2R-N=N-R'(OH)(NH_2)$$
$$NH_2R-N=N-R'-N=N-R^2(OH)$$
$$NH_2R-N=N-R'-N=$$
$$N-R^2(OH)(NH_2) \text{ etc.}$$

In the foregoing general formulæ R, R' and R² designate non-sulfonated benzene- or napthalene nuclei, including the homologous and substituted nuclei.

The preparation of the said aminoazo- or diaminoazo dyestuffs is carried out by one of the generally known methods, for instance by coupling the diazo compounds of the corresponding nitro- or acetamido compounds with the coupling-components indicated in the above formulæ and reducing or saponifying the mono- or disazo dyestuffs so formed; in single cases, for instance when using para-phenylenediamine in initial position, the dyestuffs may also be obtained by mono-diazotization of the diamino base and coupling with an appropriate coupling component. The copulation of the diazo- or tetrazo-compounds of the dyestuffs thus obtained with arylamides of the 2-hydroxynaphthalene-3-carboxylic acid may be effected in an acetic acid or alkaline solution and according to the purposes for which the dyestuffs are to be used, either in substance or in presence of a substratum or directly on the fibre.

The following examples serve to illustrate my invention:—

(1) 26,3 parts of the monoazo dyestuff obtained from para-phenylenediamine and β-naphthol are diazotized with 25–30 parts of hydrochloric acid of 20° Bé. and 7 parts of nitrite. The diazo compound is run into a solution of 33 parts of 5-chloro-1-methyl-2-anilide of 2-hydroxynaphthalene-3-carboxylic acid, dissolved with caustic soda solution and an excess of sodium acetate. The coloring matter is then isolated and mixed, i. e. ground in the usual manner with a substratum. The coupling may also be operated in presence of the substratum.

The dyestuff has the following constitution:

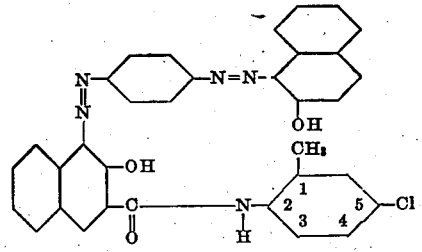

The procedure for preparing the dis-tris- or polyazo-dyestuffs is similar to that above described if as parent products are used mono-, dis- or poly-azo-dyestuffs the constitution of which may be according to one of the above indicated or a similar formula, such for instance as the dyestuffs from:

paraphenylenediamine→1-aminobenzene-2-carboxylic acid

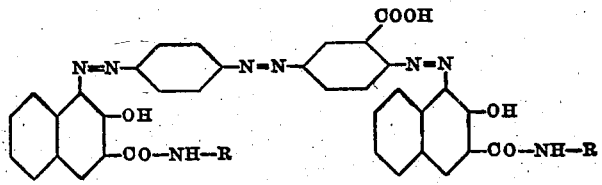

in which R stands for an aryl residue, which may be substituted or not.

para-phenylenediamine→1-aminobenzene-2-carboxylic acid-ester
para-phenylenediamine→2-hydroxynaphthalene-3-carboxylic acid

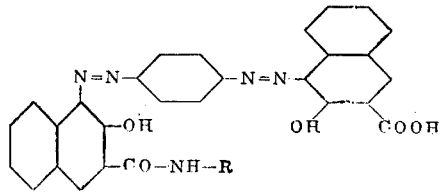

in which R stands for an aryl residue, which may be substituted or not.

para-phenylenediamine→arylamide of the 2-hydroxy-naphthalene-3-carboxylic acid
5-nitro-4-chloro-2-amino-1-phenol→3-amino-4-methoxy-1-methylbenzene
↓
reduced

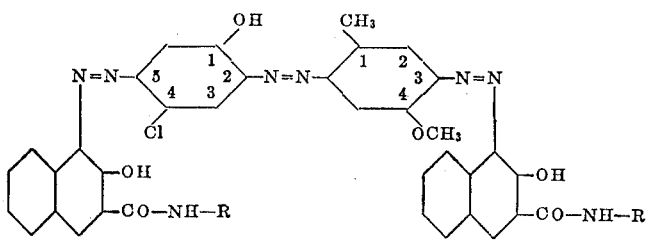

in which R stands for an aryl residue, which may be substituted or not.

5-nitro-2-aminobenzene-1-carboxylic acid→3-amino-4-methoxy-1-methylbenzene
↓
reduced
4.4'-diamino-azobenzene→2-hydroxynaphthalene
4.4'-diamino-azobenzene→2-amino-7-hydroxynaphthalene

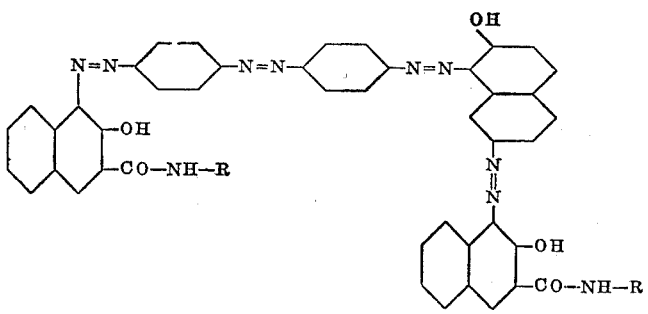

in which R stands for an aryl residue, which may be substituted or not;
or the like.

In the place of the 5-chloro-1-methyl-2-anilide of 2-hydroxy-naphthalene-3-carboxylic acid there may be used any of the arylamides of 2-hydroxynapthalene-3-carboxylic acid.

In this manner dyestuffs are obtained which give deep black dyeings of very good fastness.

(2) 100 grams of cotton yarn are impregnated with a solution containing 23,8 grams of the 2-naphthalide of 2-hydroxynaphthalene-3-carboxylic acid, 54 cc. of caustic soda solution of 34° Bé. and 60 cc. of Turkey-red oil per one litre. The material thus prepared is passed through a second bath containing 6,2 grams of a diazo compound, neutralized with sodium acetate, or sodium carbonate or chalk, of the dyestuff obtained from paraphenylenediamine and 2-hydroxynaphthalene. The dye formed upon the fiber has the formula:

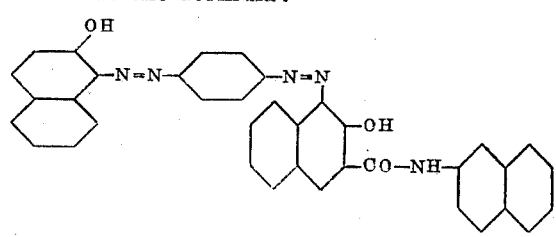

After the material has been wound off, rinsed and soaped a deep black dyeing is obtained thereon of excellent fastness. By an after-treatment with a copper salt the fastness of the dyeing to light may, as is known, be enhanced.

In an analogous manner as indicated in

Example 1 there may also in the present example be varied both the azo-dyestuff to be diazotized and the arylamide of the 2-hydroxynaphthalene-3-carboxylic acid.

I claim:

1. The process of producing azo dyes, consisting in coupling a diazo compound of an azo-dye, containing a free hydroxyl group, but no sulfo group, with an arylamide of the 2-hydroxynaphthalene-3-carboxylic acid.

2. The process of producing azo dyes which consists in coupling the diazo compound of the monoazo dye of the following constitution:

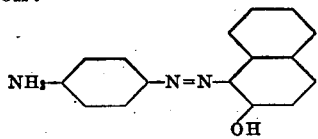

with an arylamide of the 2-hydroxynaphthalene-3-carboxylic acid.

3. The process of producing an azo dye, which consists in coupling the diazo compound of the monoazo dye of the following constitution:

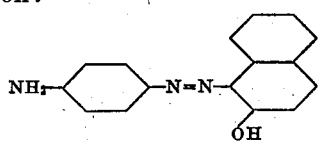

with the 5-chloro-1-methyl-2-anilide of the 2-hydroxynapthalene-3-carboxylic acid.

4. As new products, the azo dyes of the following formula:

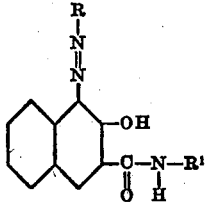

wherein R represents a residue of an azo dye containing at least one azo group and one free hydroxyl group, but no sulfo group, $R^1$ being an aryl residue, substituted or not.

5. As new products, the azo dyes of the following constitution:

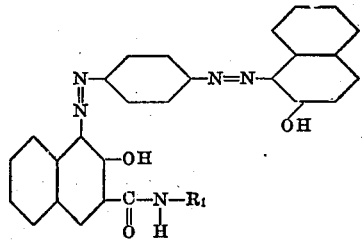

wherein $R^1$ represents an aryl residue, substituted or not.

6. As a new product, the azo dye of the following constitution:

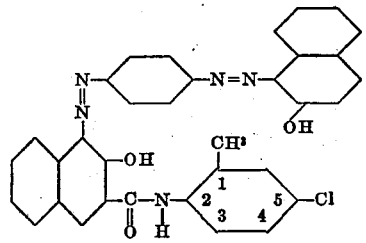

7. Material dyed with the dyestuff of claim 4.

8. Material dyed with the dyestuff of claim 5.

9. Material dyed with the dyestuff of claim 6.

In testimony whereof, I affix my signature.

HERMANN WAGNER.